(12) United States Patent
Schneider

(10) Patent No.: US 9,094,301 B2
(45) Date of Patent: Jul. 28, 2015

(54) PROVISIONING NETWORK RESOURCES BY ENVIRONMENT AND NETWORK ADDRESS

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 877 days.

(21) Appl. No.: 12/156,289

(22) Filed: May 30, 2008

(65) Prior Publication Data

US 2009/0300024 A1  Dec. 3, 2009

(51) Int. Cl.
*G06F 15/16* (2006.01)
*H04L 12/24* (2006.01)
*G06F 9/445* (2006.01)

(52) U.S. Cl.
CPC .................................. *H04L 41/0806* (2013.01)

(58) Field of Classification Search
CPC .............. H04L 29/08072; H04L 29/06; H04L 29/0809
USPC ....................................................... 709/219
See application file for complete search history.

(56) References Cited

U.S. PATENT DOCUMENTS

| | | | |
|---|---|---|---|
| 6,070,191 A | 5/2000 | Narendran et al. | |
| 7,284,062 B2 | 10/2007 | Krantz et al. | |
| 2002/0152305 A1 | 10/2002 | Jackson et al. | |
| 2003/0115570 A1* | 6/2003 | Bisceglia | 717/101 |
| 2004/0249939 A1* | 12/2004 | Amini et al. | 709/225 |
| 2005/0251573 A1 | 11/2005 | Merkow et al. | |
| 2006/0002294 A1 | 1/2006 | Chapman et al. | |
| 2006/0047813 A1 | 3/2006 | Aggarwal et al. | |
| 2006/0104220 A1 | 5/2006 | Yamazaki et al. | |
| 2006/0164992 A1 | 7/2006 | Brown et al. | |
| 2006/0179116 A1 | 8/2006 | Speeter et al. | |
| 2006/0200658 A1 | 9/2006 | Penkethma | |
| 2007/0038994 A1* | 2/2007 | Davis et al. | 717/174 |
| 2007/0116234 A1 | 5/2007 | Schneider et al. | |
| 2008/0063003 A1 | 3/2008 | O'Neal | |
| 2008/0114770 A1 | 5/2008 | Chen et al. | |
| 2008/0235266 A1 | 9/2008 | Huang et al. | |
| 2009/0003574 A1 | 1/2009 | Schneider et al. | |
| 2009/0007091 A1 | 1/2009 | Appiah et al. | |
| 2009/0043999 A1* | 2/2009 | Hatasaki et al. | 713/1 |
| 2010/0217841 A1 | 8/2010 | Schneider | |
| 2011/0029599 A1* | 2/2011 | Pulleyn et al. | 709/203 |

OTHER PUBLICATIONS

Red Hat Office Action for U.S. Appl. No. 12/394,004, mailed Sep. 22, 2010.
Red Hat Office Action for U.S. Appl. No. 12/394,004, mailed Jan. 17, 2011.

(Continued)

*Primary Examiner* — Chris Parry
*Assistant Examiner* — Alan S Chou
(74) *Attorney, Agent, or Firm* — Lowenstein Sandler LLP

(57) ABSTRACT

A method and apparatus for facilitating provisioning of network appliances based on different environments. A mapping server is provided to communicate with networked devices from different environments. The mapping server receives a request for a network address of a corresponding configuration server from one of the networked devices, determines a network identifier of this networked devices based on the request, and searches a mapping table for the network address of the corresponding configuration server using the network identifier of the networked device. The mapping server then provides the network address of the corresponding configuration server to the networked device.

17 Claims, 4 Drawing Sheets

(56) References Cited

OTHER PUBLICATIONS

USPTO, Office Action for U.S. Appl. No. 12/394,004 mailed Dec. 18, 2013.
USPTO, Final Office Action for U.S. Appl. No. 12/394,004 mailed Aug. 4, 2014.
Red Hat, Inc. "Red Hat Command Center: Users Guide 3.18", 2007, 318 pages.
Red Hat, Inc. "Red Hat Command Center 3.18: Check Reference", 2007, 178 pages.
Red Hat, Inc. "Red Hat Command Center 3.18: Setup and Installation Guide", 2007, 33 pages.
Red Hat, Inc. "Red Hat Command Center 3.18: Release Notes", 2007, 7 pages.

* cited by examiner

PROVISIONING NETWORK RESOURCES BY ENVIRONMENT AND NETWORK ADDRESS

TECHNICAL FIELD

Embodiments of the present invention relate to networked computers, and more specifically to provisioning networked computers by environment and network address.

BACKGROUND

Networked computers are used to transmit and fetch information to and from local sources (e.g., computers used in a business) and remote sources (e.g., enterprise services offered over the Internet). One exemplary network computer is a network appliance that is placed on a customer network to monitor devices of the customer network. While performing its intended operations, the network appliance can communicate with different components of a service provider's system. These components may include, for example, a web server providing user interfaces (UIs) to the customer network's IT administrator and other users, a backend server receiving monitoring data from the network appliance and generating alerts and various reports, a database server storing monitoring data in a database, etc.

A network appliance can operate in the production environment by default. However, the service provider usually develops and deploys its services in many other environments. For example, the service provider may develop its services in the development environment, test its services in the quality assurance (QA) environment, and deploy its services in the staging environment or the production environment. When the network appliance designated to operate in the production environment by default is used in a different environment, the network appliance needs to be manually switched to the different environment. As with any manual operation, the above switching of the network appliance is prone to human errors, is inefficient, and creates inconvenience for users.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
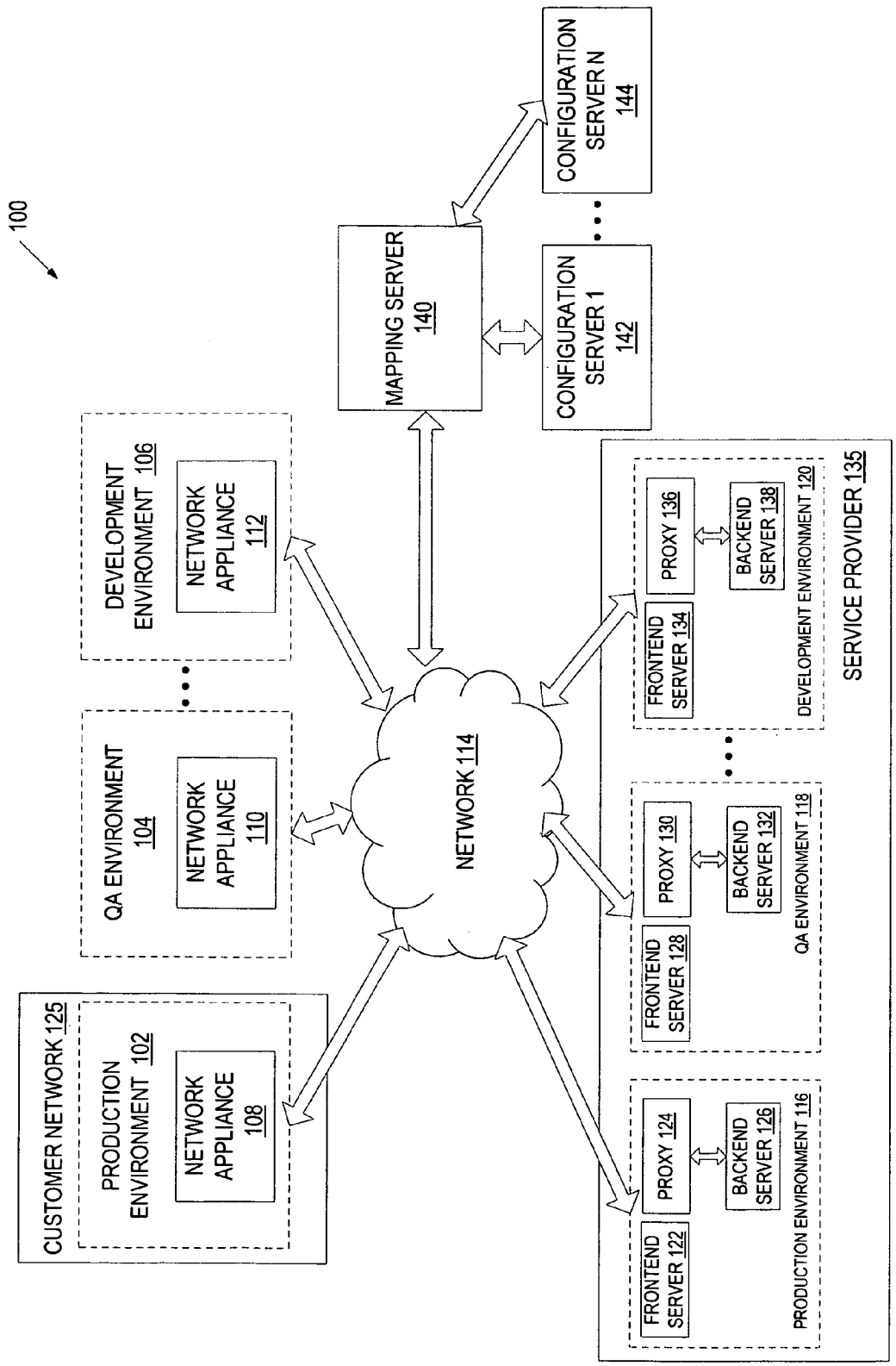
FIG. 1 illustrates an exemplary network architecture in which embodiments of the present invention may operate.

Described herein is a method and system for provisioning networked devices based on different environments. In one embodiment, a mapping server is provided to communicate with networked devices from different environments. The different environments may include, for example, a production environment, a quality assurance (QA) environment, a development environment, a staging environment, etc. A mapping server may, for example, be a special-purpose domain name system (DNS) server. The mapping server may receive a request for a network address of a corresponding configuration server from a networked device (e.g., a network appliance). Based on the request, the mapping server can determine a network identifier of the networked device, and then use the network identifier to search a mapping table for the network address of a configuration server that is associated with an intended environment of the networked device. The mapping server provides the network address of the configuration server to the network device, which can use it to obtain configuration information appropriate for its intended environment. The configuration information may, for example, specify IP addresses, host names and/or URLs of servers that the networked device should interact with in order to perform its designated functionality.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary network architecture 100 in which embodiments of the present invention may operate. The network architecture 100 may include a service provider 135 connected with a customer network 125 (e.g., a local area network (LAN), wide area network (WAN), intranet, etc.) over a public network 114 (e.g., the Internet). Alternatively, the customer network 125 may be connected with the service provider 135 via a private network (e.g., an intranet, virtual private network (VPN), etc.).

Referring to FIG. 1, the customer network 125 may represent a network of an enterprise and may include such devices as desktop computers, laptop computers, network printers, switches, routers, gateways, firewalls, or any other devices having a network address. In one embodiment, the customer network 125 also includes a network appliance 108. The network appliance 108 is a device that is configurable over a network. The network appliance 108 may be a computing device such as, for example, a desktop computer, laptop computer, server, etc. The network appliance 108 may be placed in the customer network 125 to perform functions related to network monitoring upon connection with the customer network 125.

Service provider 135 provides one or more services to customer network 125. In one embodiment, service provider 135 uses the network appliance 108 to collect information about the customer network 125 and devices on the customer network 125. The service provider 135 then analyzes this information, and generates alerts or presents the analysis to a user such as an IT administrator. Alternatively, the service provider 135 may provide other services, such as network indexing service, etc.

The service provider 135 may develop and deploy its services in several different environments including, for example, a production environment 116, a QA environment 118, a development environment 120, and a staging environment (not shown). Each environment may have its own set of servers responsible for facilitating monitoring operations pertaining to devices in a given environment.

The devices of the customer network 125 operate in production environment 102. In addition, the development and testing of the service provider's services is accomplished using devices operating in QA environment 104, development environment 106, and staging environment (not shown). These environments may be part of the service provider's network and/or some external network(s) coupled to the service provider 135 via a public or private network. In one embodiment, devices in a particular subnet are assigned to a given environment, with each subnet having a unique network ID (a binary sequence with which addresses of all nodes in the subnet start). Each environment may have one or more network appliances intended to perform monitoring operations in the relevant environment (e.g., network appliances 110 through 112).

A set of the service provider's servers in each environment maintained by the service provider 135 may include, for example, a front end server, a proxy server, and a backend server that may reside on the same or different devices. Alternatively, other server configurations may be implemented (e.g., a specific environment of service provider 135 may include more or fewer servers, which may have redundant or different functionality). Front end servers 122, 128 and 134 may provide interfaces to clients in respective environments. Through the front end servers, users of client devices may request data, initiate actions, receive information, etc. Network appliances 108, 110 and 112 may also communicate with front end servers 122, 128 and 135, respectively, to request a service, initiate an action, report data, etc. Front end servers may be web application servers that provide web application interfaces accessible to clients via a web browser.

Backend servers 126, 132 and 138 may communicate with network appliances 108, 110 and 112, respectively, to send and/or receive such data as identity certificate information, network status updates, transactions, etc. Each backend server may communicate with a respective network appliance through a proxy server (e.g., proxy server 124, 130 or 136). A proxy server receives transmissions and, if appropriate, forwards them to a corresponding backend server. Alternatively, no proxy server may be present, or multiple proxy servers may be used.

A network appliance placed in a specific environment should perform monitoring of devices operating in this environment. As such, a network appliance should interact with a set of servers from a relevant environment within the service provider's system 135. However, a network appliance may be configured to operate in a default environment (e.g., production environment) and may need to switch to a different environment manually. In order to avoid human errors and inconvenience associated with this human interaction, the service provider 135 provides a mapping server 140 that directs a network appliance to a respective configuration server (e.g., configuration server 142, 144, etc.). Each configuration server stores configuration information for a specific environment. The configuration information may include, for example, IP addresses, host names and URLs of servers operating in a relevant environment. For example, a configuration server 142 associated with the production environment may provide IP addresses, host names and URLs of front end server 122, proxy 124 and backend server 126. Similarly, a configuration server 144 associated with the QA environment may provide IP addresses, host names and URLs of front end server 128, proxy 130 and backend server 132, and so on.

The mapping server 140 and configuration servers 142 through 144 may be provided as part of service provider 135's network or as separate servers coupled to the network appliances 108, 110 and 112 via a network (e.g., network 114). The mapping server 140 may reside on a different or the same machine as some or all of the configuration servers 142 through 144, which may in turn reside on the same machine or separate machines. In one embodiment, the mapping server 140 is a special-purpose DNS server that supplies network addresses of relevant configuration servers to network appliances 108, 110 and 112, or any other networked devices that need to be configured over a network in accordance with a specific environment. Alternatively, the mapping server 140 is a web server hosting a web application that is queried by the network appliances 108, 110 and 112 for network addresses of relevant configuration servers.

Figure 2:
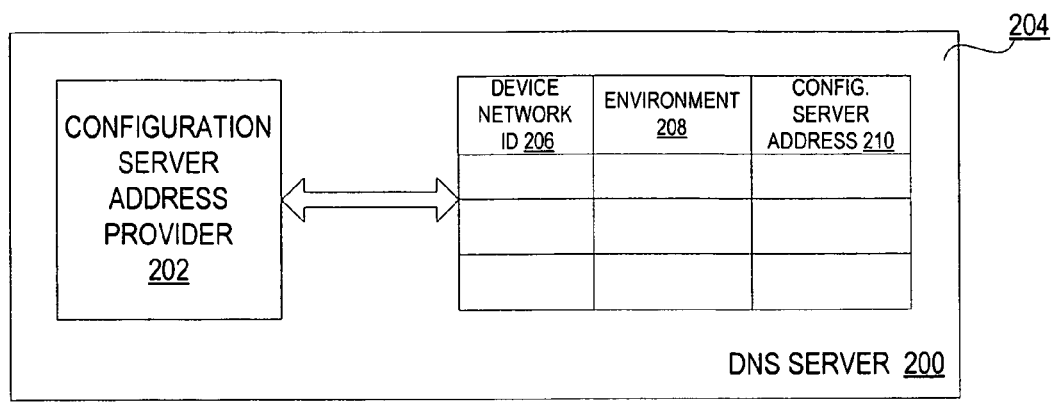
FIG. 2 is a block diagram of one embodiment of a DNS server facilitating provisioning of networked devices by environment and network address.

FIG. 2 is a block diagram of one embodiment of a DNS server 200. The DNS server 200 may include a configuration server address provider 202 and a mapping table 204. The mapping table 204 may store device network IDs 206, environments 208 and configuration server addresses 210. Device network ID 206 may be an IP address of a device or a network ID of a device's subnet. Environment 208 may be a code associated with a specific environment (e.g., "1" for production, "2" for QA, etc.), or the name of the specific environment. Configuration server address 210 may be an IP address of a relevant configuration server.

In one embodiment, a user (e.g., an IT administrator) can register devices from different environments in the table 204 based on their IP addresses or network addresses of their subnets. The DNS server 200 may provide a user interface (e.g., command-line interface or a graphical user interface) to allow authorized users to add data to, or update data in, the table 204.

The configuration server address provider 202 receives requests for network addresses of relevant configuration servers from networked devices such as network appliances, and extracts network IDs of these devices from the received requests. The configuration server address provider 202 uses a device network ID extracted from a request to search the mapping table. Upon finding a match, the configuration server address provider 202 returns the configuration server address contained in the matching record to the requestor. In one embodiment, the configuration server address provider 202 also specifies the environment of the requester in the response (e.g., in a text field of a DNS response). The requestor may then use this environment identifier to perform operations intended for this environment. For example, if software of a network appliance asks for process A to be performed when operating in the production environment, and process B to be performed when operating in the QA environment, the environment identifier provided by the DNS sever 200 can be used to determine which process should be performed.

In one embodiment, if the configuration service address provider 202 does not find a record matching the requestor's network ID in the table 204, the configuration server address provider 202 assigns the requestor's network ID to a default environment (e.g., production environment) and returns the IP address of a configuration server associated with the default environment.

Figure 3:
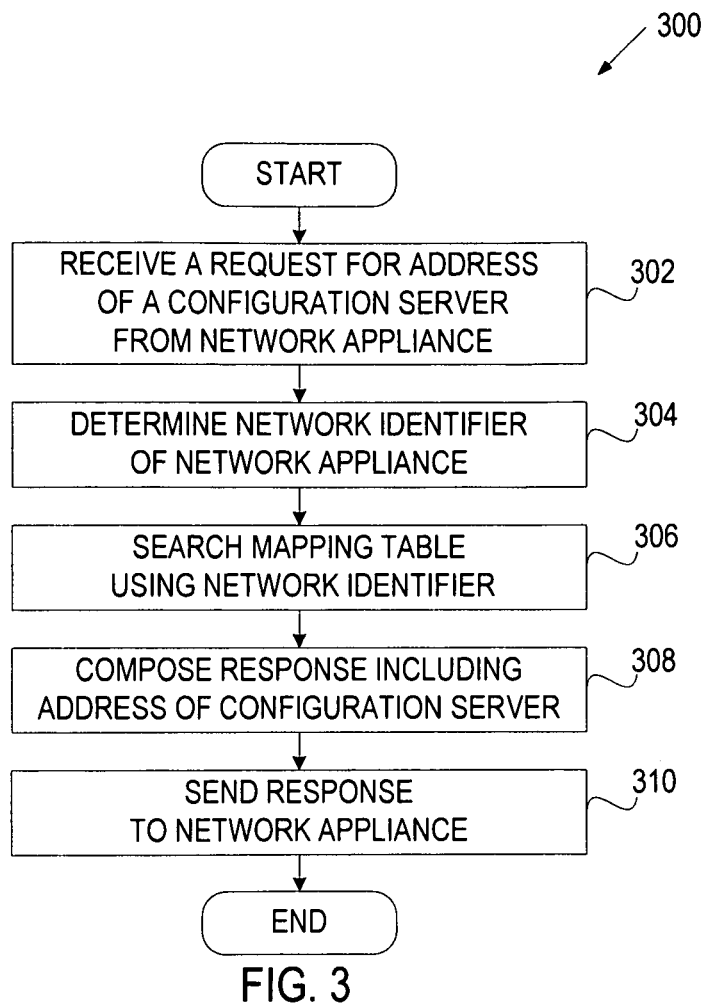
FIG. 3 is a flow diagram of one embodiment of a method for facilitating provisioning of networked devices by environment and network address.

FIG. 3 is a flow diagram illustrating one embodiment of a method 300 for facilitating provisioning of network appliances based on different environments. The method may be performed by processing logic (that can be executed by the network appliance) that may comprise hardware (e.g., circuitry, dedicated logic, programmable logic, microcode, etc.), software (e.g., instructions run on a processing device to perform hardware simulation), or a combination thereof. In one embodiment, the method 300 is performed by a mapping server, such as mapping server 140 of FIG. 1.

Referring to FIG. 3, method 300 begins with processing logic receiving a request for a network address of a configuration server from a network appliance (block 302). At block 304, processing logic determines a network ID of the network appliance. The network ID may be the IP address of the network appliance or a network ID of the network appliance's subnet.

At block 306, processing logic searches a mapping table using the network ID of the network appliance. Upon finding a matching record in the mapping table, processing logic creates a response including the address of a configuration server from the matching record (block 308). In one embodiment, processing logic also includes, in the response (e.g., in a text field of a DNS response), the identifier of the environment from the matching record of the mapping table. In one embodiment, if processing logic does not find a matching record in the mapping table, processing logic assigns the network ID of the network appliance to a default environment (e.g., production environment), and includes the network address of a configuration server associated with the default environment in the message.

At block 310, processing logic sends the response to the network appliance. The network appliance may then request configuration information from the specified configuration server and began interacting the service provider's servers identified in the configuration information.

Figure 4:
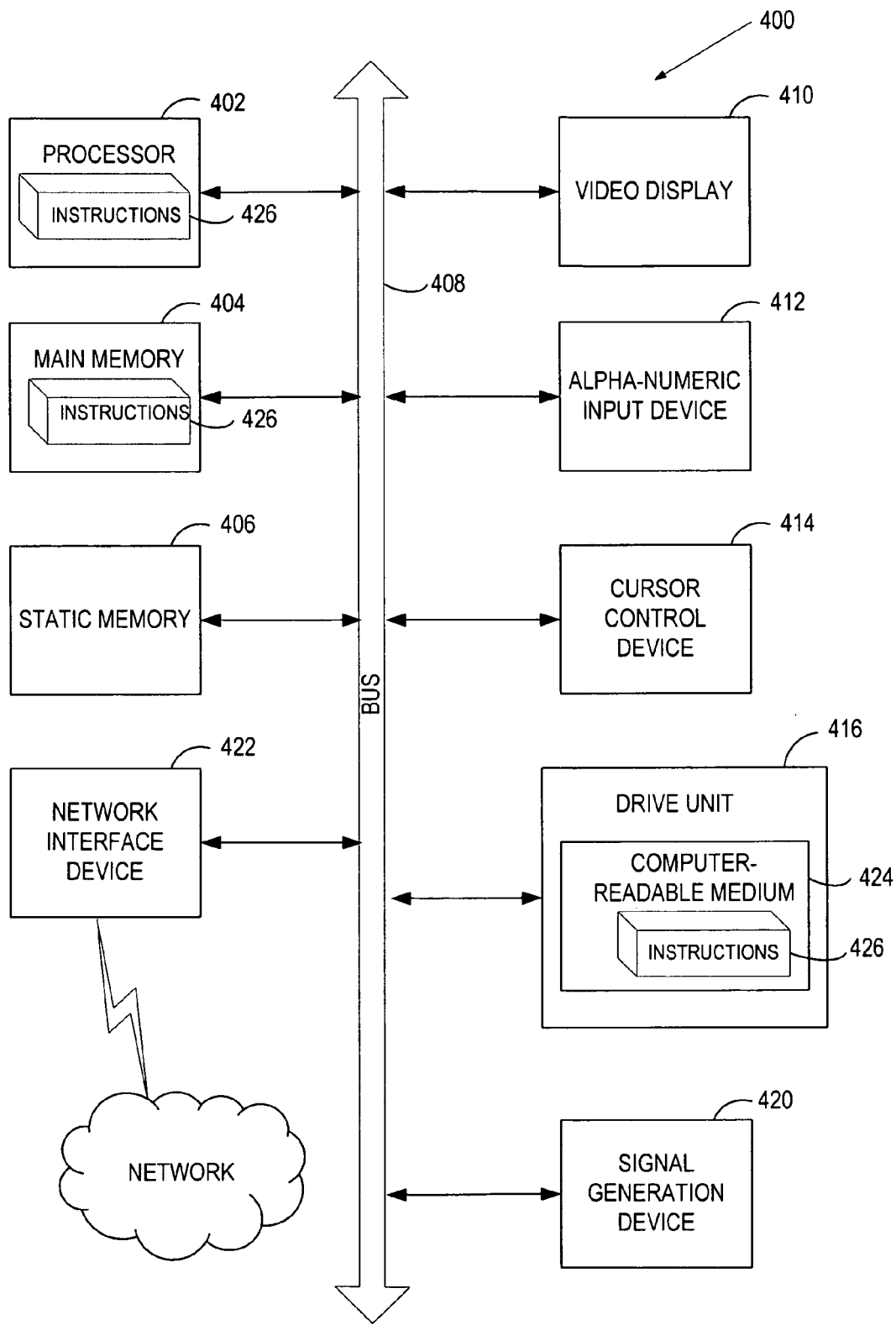
FIG. 4 illustrates a diagrammatic representation of a machine in the exemplary form of a computer system, in accordance with one embodiment of the present invention.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 418 (e.g., a data storage device), which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The secondary memory 418 may include a machine-readable storage medium (or more specifically a computer-readable storage medium) 431 on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-readable storage media. The software 422 may further be transmitted or received over a network 420 via the network interface device 408.

While the machine-readable storage medium 431 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
   communicating, by a mapping server, with networked devices operating in environments, wherein each of the environments is linked with a configuration server that maintains configuration information to configure networked devices of the environment for operation in the environment, and wherein the environments comprise two or more of a production environment, a quality assurance (QA) environment, a development environment, or a staging environment;
   in response to a network device of the networked devices being placed in an environment of the environments and initializing operation in the environment, receiving, at the mapping server from the network device, a request for a network address of a configuration server that corresponds to the environment in which the requesting network device is initializing, wherein the network device is to send the request to the mapping server without human interaction;
   determining, by the mapping server, the environment that the network device is located, the determining in view of a network identifier of the network device;
   searching a mapping table of the mapping server for the requested network address of the configuration server using the determined network identifier, wherein the mapping table provides a correspondence between the network identifier of the network device, the requested configuration server, and the environment that the network device is located, wherein the searching the mapping table for the network address of the requested configuration server comprises:
      when the mapping table comprises the network identifier of the network device, returning a network address of the requested configuration server corresponding to the network identifier; and
      when the mapping table does not comprise the network identifier of the network device, returning a network address of a configuration server corresponding to a default environment of the environments; and
   providing a response to the network device, the response comprising:
      the network address of the configuration server to the network device, the configuration server maintaining configuration information identifying one or more servers to be interacted with by the network device in the environment that the network device is initialized; and
      an environment identifier corresponding to the configuration server having the network address, wherein the environment identifier is used by the network device to perform operations specific to the environment of the environment identifier when the network device is initialized in the environment.

2. The method of claim 1 wherein the mapping server comprises a special-purpose domain name system (DNS) server.

3. The method of claim 1 wherein the network device comprises a network appliance designated to monitor devices within the environment and send monitoring data to a service provider maintaining the environments.

4. The method of claim 1 wherein the network identifier of the network device comprises at least one of an Internet protocol (IP) address of the network device or a subnet identifier of a subnet comprising the network device.

5. The method of claim 1 further comprising:
   providing a user interface to facilitate user input for the mapping table.

6. The method of claim 1 wherein providing the network address of the requested configuration server to the network device comprises:
   composing a message containing an IP address of the requested configuration server, and the environment comprising the one or more servers; and
   sending the composed message to the network device.

7. A non-transitory computer-readable storage medium including instructions that, when executed by a processing device, causes the processing device to:
   communicate, by the processing device, a mapping server, with networked devices operating in environments, wherein each of the environments is linked with a configuration server that maintains configuration information to configure networked devices of the environment for operation in the environment, and wherein the environments comprise two or more of a production environment, a quality assurance (QA) environment, a development environment, or a staging environment;
   in response to a network device of the networked devices being placed in an environment of the environments and initializing operation in the environment, receive, at the mapping server from the network device, a request for a network address of a configuration server that corresponds to the environment in which the requesting network device is initializing, wherein the network device is to send the request to the mapping server without human interaction;
   determine, by the mapping server, the environment that the network device is located, the determining in view of a network identifier of the network device;
   search a mapping table of the mapping server for the requested network address of the configuration server using the determined network identifier, wherein the mapping table provides a correspondence between the network identifier of the network device, the requested configuration server, and the environment that the network device is located, wherein the searching the mapping table for the network address of the requested configuration server comprises:
      when the mapping table comprises the network identifier of the network device, returning a network address of the requested configuration server corresponding to the network identifier; and when the mapping table does not comprise the network identifier of the network device, returning a network address of a configuration server corresponding to a default environment of the environments; and provide a response to the network device, the response comprising:

the network address of the configuration server to the network device, the configuration server maintaining configuration information identifying one or more servers to be interacted with by the network device in the environment that the network device is initialized; and an environment identifier corresponding to the configuration server having the network address, wherein the environment identifier is used by the network device to perform operations specific to the environment of the environment identifier when the network device is initialized in the environment.

8. The non-transitory computer-readable storage medium of claim 7 wherein the mapping server comprises a special-purpose domain name system (DNS) server.

9. The non-transitory computer-readable storage medium of claim 7 wherein the network device comprises a network appliance designated to monitor devices within the environment and send monitoring data to a service provider maintaining the environments.

10. The non-transitory computer-readable storage medium of claim 7 wherein the network identifier of the network device comprises at least one of an Internet protocol (IP) address of the network device or a subnet identifier of a subnet comprising the network device.

11. The non-transitory computer-readable storage medium of claim 7 wherein providing the network address of the requested configuration server to the network device comprises:

composing a message comprising an IP address of the requested configuration server, and a corresponding environment comprising the one or more servers; and sending the composed message to the network device.

12. The non-transitory computer-readable storage medium of claim 7, wherein the operations further comprise providing a user interface to facilitate user input for the mapping table.

13. An apparatus, comprising:

a memory comprising a mapping table to store network identifiers of networked devices and network addresses of configuration servers operating in environments, wherein the environments comprise two or more of a production environment, a quality assurance (QA) environment, a development environment, or a staging environment; and a processing device, communicably coupled to the memory, the processing device to:

communicate with the networked devices operating in the environments, wherein each of the environments is linked with a configuration server that maintains configuration information to configure networked devices of the environment for operation in the environment;

in response to a network device of the networked devices being placed in an environment of the environments and initializing operation in the environment, cause a configuration server address provider to receive, from the network device, a request for a network address of a configuration server that corresponds to the environment in which the requesting network device is initializing, wherein the network device is to send the request to the mapping server without human interaction;

determine the environment that the network device is located, the determining in view of a network identifier of the network device;

search the mapping table for the requested network address of the configuration server using the determined network identifier, wherein the mapping table provides a correspondence between the network identifier of the network device, the requested configuration server, and the environment that the network device is located, wherein searching the mapping table for the network address of the requested configuration server comprises:

when the mapping table comprises the network identifier of the network device, returning a network address of the requested configuration server corresponding to the network identifier; and when the mapping table does not comprise the network identifier of the network device, returning a network address of a configuration server corresponding to a default environment of the environments; and provide a response to the network device, the response comprising:

the network address of the configuration server to the network device, the configuration server maintaining configuration information identifying one or more servers to be interacted with by the network device in the environment that the network device is initialized; and an environment identifier corresponding to the configuration server having the network address, wherein the environment identifier is used by the network device to perform operations specific to the environment of the environment identifier when the network device is initialized in the environment.

14. The apparatus of claim 13 wherein:

the apparatus comprises a special-purpose domain name system (DNS) server; and the one of the networked devices comprises a network appliance designated to monitor devices within the environment and send monitoring data to a service provider maintaining the environments.

15. The apparatus of claim 13 wherein the network identifier of the network device comprises at least one of an Internet protocol (IP) address of the network device or a subnet identifier of a subnet comprising the network device.

16. The apparatus of claim 13, wherein the processing device to provide the network address of the requested configuration server to the network device further comprises the processing device to:

compose a message containing an IP address of the requested configuration server, and the environment comprising the one or more servers; and send the composed message to the network device.

17. The apparatus of claim 13, wherein the processing device further to provide a user interface to facilitate user input for the mapping table.

* * * * *